United States Patent Office 3,507,839
Patented Apr. 21, 1970

3,507,839
CURING PROCESS FOR CARBOXYL POLYMERS USING TETRAIMINES
Ray C. Christena, Millington, N.J., and Edward Broderick, Perkasie, Pa., assignors to Thiokol Chemical Corporation, Bristol, Pa., a corporation of Delaware
No Drawing. Continuation-in-part of application Ser. No. 171,260, Feb. 5, 1962. This application Oct. 5, 1965, Ser. No. 493,250
Int. Cl. C08d 15/00, 19/00
U.S. Cl. 260—78.5    10 Claims

ABSTRACT OF THE DISCLOSURE

Polymeric materials containing carboxyl groups are cured with tetrafunctional imine compounds having the structure

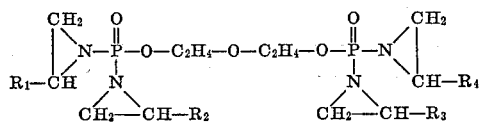

wherein $R_1$, $R_2$, $R_3$ and $R_4$ are selected from the group consisting of H and $CH_3$.

---

The present invention relates to a process for curing polymeric materials. More particularly, it relates to a novel process for curing carboxyl-containing polymeric materials with certain tetrafunctional imine compounds. This application is a continuation-in-part of copending application Ser. No. 171,260 filed Feb. 5, 1962, now U.S. Patent 3,244,697.

The object of this invention is to provide a process for curing polymeric material containing a plurality of reactive carboxyl groups with certain tetrafunctional imine compounds.

The tetrafunctional imine compounds used as curing agents in the present invention have the structure

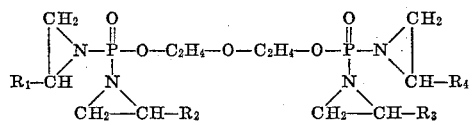

wherein $R_1$, $R_2$, $R_3$, and $R_4$ are selected from the group consisting of H and $CH_3$. They may be prepared by the esterification of diethylene glycol with phosphorus oxychloride and then by further reaction of the ester thus formed with alkylene imines such as ethyleneimine and propyleneimine as described in co-pending application Ser. No. 171,260.

The curing agents used in the present invention are oily liquids, having a viscosity between 1 and 6 poises at 80° F. They are tetrafunctional, having four reactive imine sites per molecular unit, each of which is capable of reacting with the active hydrogen of a carboxyl radical on a polymer molecule to produce ring opening and recombination reactions as shown in Equation I. To form cured, polymeric networks where a polymer has a plurality, that is, about 2 or more reactive carboxyl sites per molecule, cure of the polymer with the curing agents will occur upon heat treatment of the cure system by several coupling reactions such as by chain extension, that is, linking one end of one polymer molecule to that of another, by crosslinking, that is, joining two or more polymer molecules through reaction sites pendant to the molecular backbones by the relatively shortlengthed curing agent molecules, and by the bunching effect of ring formation reactions which occurs when two or more imine sites on a particular curing agent molecule react with two or more carboxyl sites on the same polymer molecule. Also, because of the high degree of functionality of the curing agents of the present invention, many combinations of chain extension, crosslinking and ring formation reactions are possible for any specific curing agent/polycarboxylic polymer cure system.

Equation I:

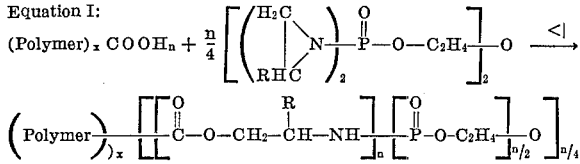

in which $x$ is the number of polymer chains being cured and $n$ is the number of carboxyl groups on the polymer chains that are reacted with the curing agent.

Liquid and solid polymers which have sufficient reactive carboxyl groups to impart at least 0.05 acid equivalent weights to each 100 g. of uncured polymer, and possessing at least about 2 reactive carboxyl sites per molecule may be cured with the novel curing agents of the present invention. Where carboxyl equivalents are less than 0.05, some degree of cure may be obtained upon heat treatment of the cure system, however, the cure products so produced do not show good elastomeric properties. Where less than about 2 reactive carboxyl sites are present per molecule, the repetitive chain extension, crosslinking and ring forming reactions necessary for good cure do not usually occur. The products so produced would not provide the desired elastomeric properties due to lack of crosslinking, etc.

Use of the curing agents in concentration ratios of about 1.5 equivalent weights of tetrafunctional imine for each equivalent weight of the polycarboxyl containing polymer employed is recommended to insure an adequate cure. Also, intimate mixing of uncured polymer and the curing agent has been found necessary to provide good cure. The latter may be accomplished by milling, as with several passes on a three roller paint mill.

Heat treatment of the cure systems may also be needed to provide a resilient cure product. This may be effected by heating the systems within the range of 80 to 225° F., the preferred temperature of cure being dictated by the nature of the specific polymer system, the quantity of acid equivalent values present in the uncured polymer, and also by the speed of cure desired. For copolymers of butadiene and acrylic acid, and copolymers of isoprene and methacrylic acid which have carboxyl equivalent values of about 0.06/100 g. copolymer, the favored cure conditions were found to be at about 170° F. for about 24 hours to obtain the desired elastomeric properties. The polycarboxyl-containing polymers which may be cured with the tetrafunctional imine curing agents described herein include among others copolymers of (A) an olefinically unsaturated monomer selected from the group consisting of butadiene, isoprene, vinyl chloride and vinylidene chloride and (B) an olefinically unsaturated carboxyl-containing monomer selected from the group consisting of acrylic acid, methacrylic acid, and a monoalkyl maleate. The cured products of the present invention are soft rubbers which are particularly suitable, because of this fact, for use as rocket propellant binders.

The following examples are merely illustrative of the scope of the invention and are not intended as a limitation upon the scope thereof.

EXAMPLE 1

Fifty-three grams (0.5 mole) of diethylene glycol were added dropwise with stirring to 339 g. (2 moles) of phosphorous oxychloride in a glass reactor open to the atmosphere by means of a dropping funnel over a 15 minute period. The temperature was maintained at 60 to 70° C. during addition, and also for an additional 2 hours at the end of which time the pot contents were cooled to ambient. One hundred sixty-six grams of a viscous liquid pot product having a chlorine content of 38.56% by weight were collected, and this was used as is as the tetrachlorophosphate ester. Eighty-five and one-half grams (1.5 moles) of propylene imine and 207 g. of potassium carbonate were slowly added with stirring to 250 ml. of water in a 1-liter 3-necked reaction vessel over 10 minutes at temperatures of 10 to 20° C.

One-hundred sixty-two grams (0.3 mole) of the tetrachlorophosphate ester produced above were dissolved in 250 ml. of benzene and then added dropwise with stirring to the aqueous propylene imine $K_2CO_3$ system over a 1½ hour period at temperatures of 10 to 20° C. The reaction mixture was stirred for an additional 1½ hours and then was permitted to come to room temperature. The pot contents were transferred to a separatory funnel, and the denser aqueous phase was removed and discarded. The organic mixture was transferred to a vacuum flask and stripped of benzene at ca. 15 mm. Hg over a 16 hour period. The remaining product was heavily laden with solids, which were removed through vacuum filtration. The filtered product, diethylene glycol bis(dipropyleneimino)phosphine oxide, was a light yellow, clear liquid having a viscosity of about 2 poises, a nitrogen content of about 13.08% (theoretical—13.03%), and a phosphorus content of 15.28% (theoretical—14.7%). The product was then suitable for use as is.

Diethylene glycol bis(diethylenimino)phosphine oxide may be obtained by the same procedure by using ethylene imine instead of propylene imine as shown above.

EXAMPLE 2

Nine and one-tenth grams of diethylene glycol bis(dipropylenimino) phosphine oxide were intimately mixed on a 3-roller paint mill with 100 g. of a liquid copolymer of butadiene and acrylic acid having a carboxyl equivalent content of about 0.06. The cure mixture was poured into an aluminum cup and permitted to cure at 170° F. Within 3 hours the cure mixture had set up to a gel, and at the end of 22 hours a soft (about 15 to 20 Shore A durometer degrees) rubbery solid was obtained.

We claim:
1. A process which comprises curing a carboxyl-containing polymer with a curing agent having the formula

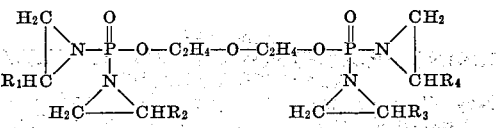

in which $R_1$, $R_2$, $R_3$ and $R_4$ are selected from the group consisting of H and $CH_3$.

2. A process as in claim 1 in which $R_1$, $R_2$, $R_3$ and $R_4$ are $CH_3$.

3. A process as in claim 1 in which said carboxyl-containing polymer is a copolymer of (A) an olefinically unsaturated monomer selected from the group consisting of butadiene, isoprene, vinyl chloride and vinylidene chloride and (B) an olefinically unsaturated carboxyl-containing monomer selected from the group consisting of acrylic acid, methacrylic acid, and a monoalkyl maleate.

4. A process as in claim 3 in which $R_1$, $R_2$, $R_3$, and $R_4$ are $CH_3$.

5. A process as in claim 4 in which said carboxyl-containing polymer is a copolymer of butadiene and acrylic acid.

6. A composition of matter prepared by the process of claim 1.

7. A composition of matter prepared by the process of claim 2.

8. A composition of matter prepared by the process of claim 3.

9. A composition of matter prepared by the process of claim 4.

10. A composition of matter prepared by the process of claim 5.

References Cited

UNITED STATES PATENTS 3,244,697   4/1966   Christena et al. _____ 260—239

FOREIGN PATENTS 984,278   2/1965   Great Britain.
3,579   5/1961   Japan.

JOSEPH L. SCHOFER, Primary Examiner

W. F. HAMROCK, Assistant Examiner

U.S. Cl. X.R.

260—82.1, 83.5, 87.5, 87.7, 96, 239